United States Patent
Du et al.

(12) United States Patent
(10) Patent No.: US 10,262,808 B2
(45) Date of Patent: Apr. 16, 2019

(54) CONDUCTIVE COMPOSITE AND CAPACITOR UTILIZING THE SAME

(71) Applicant: INDUSTRIAL TECHNOLOGY RESEARCH INSTITUTE, Hsinchu (TW)

(72) Inventors: Yi-Chang Du, Taoyuan (TW); Li-Duan Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 282 days.

(21) Appl. No.: 15/350,850

(22) Filed: Nov. 14, 2016

(65) Prior Publication Data
US 2017/0186555 A1    Jun. 29, 2017

(30) Foreign Application Priority Data
Dec. 24, 2015    (TW) .............................. 104143523 A

(51) Int. Cl.
| H01G 9/00 | (2006.01) |
| H01G 9/04 | (2006.01) |
| H01G 9/07 | (2006.01) |
| H01G 9/15 | (2006.01) |
| H01G 9/025 | (2006.01) |
| H01G 9/032 | (2006.01) |
| H01G 9/045 | (2006.01) |

(52) U.S. Cl.
CPC .............. *H01G 9/15* (2013.01); *H01G 9/0036* (2013.01); *H01G 9/025* (2013.01); *H01G 9/032* (2013.01); *H01G 9/045* (2013.01); *H01G 9/07* (2013.01); *H01G 2009/05* (2013.01)

(58) Field of Classification Search
CPC .......... H01G 9/15; H01G 7/025; H01G 7/028; H01G 2009/05; H01G 2009/0404; H01G 2009/0408; H01G 2009/042; H01G 2009/045
See application file for complete search history.

(56) References Cited

U.S. PATENT DOCUMENTS

| 4,780,796 A | 10/1988 | Fukuda et al. |
| 4,910,645 A | 3/1990 | Jonas et al. |
| 7,379,289 B2 | 5/2008 | Nitta et al. |
| 7,621,970 B2 | 11/2009 | Furusawa et al. |
| 7,663,865 B2 | 2/2010 | Toia et al. |
| 7,736,398 B2 | 6/2010 | Tateishi et al. |
| 7,859,828 B2 | 12/2010 | Sugihara et al. |
| 8,081,417 B2 | 12/2011 | Toia et al. |
| 8,405,956 B2 | 3/2013 | Dreissig et al. |
| 8,441,776 B2 | 5/2013 | Komatsu et al. |
| 8,654,510 B2 | 2/2014 | Ueda et al. |
| 8,741,457 B2 | 6/2014 | Toia et al. |
| 2011/0252613 A1 | 10/2011 | Freeman et al. |
| 2013/0026409 A1 | 1/2013 | Baker et al. |

FOREIGN PATENT DOCUMENTS

| CN | 1381854 A | 11/2002 |
| CN | 1463473 A | 12/2003 |
| CN | 100382212 C | 4/2008 |
| JP | 2011-82314 A | 4/2011 |
| TW | 201304240 A1 | 1/2013 |
| WO | WO 2014/046253 A1 | 3/2014 |
| WO | WO 2015/149211 A1 | 10/2015 |

OTHER PUBLICATIONS

Chinese Office Action and Search Report dated Feb. 26, 2018 for corresponding Chinese Application No. 201511004978.6.
Taiwanese Office Action and Search Report, dated Jan. 23, 2017, for Taiwanese Application No. 104143523.
Frédéric Vidal et al., "Long-life air working conducting semi-IPN/ionic liquid based actuator", Synthetic Metals, 2004, vol. 142, pp. 287-291.
Jennifer A. Irvin et al., "Dominant Ion Transport Processes of Ionic Liquid Electrolyte in Poly(3, 4-ethylenedioxythiophene)", Journal of Polymer Science, Part B: Polymer Physics, 2013, vol. 51, pp. 337-342.
Office action dated Jul. 12, 2016 for the corresponding TW application 104143523.
Stephan Kirchmeyer et al., "Scientific Importance, Properties and Growing Applications of Poly(3, 4-ethylenedioxythiophene)", Journal of Materials Chemistry, 2005, vol. 15, pp. 2077-2088.
Udo Lang et al., "Microscopical Investigations of PEDOT:PSS Thin Films", Advanced Functional Materials, 2009, vol. 19, pp. 1215-1220.
Ushula M. Tefashe et al., "Localized Corrosion Behavior of AZ31B Magnesium Alloy with an Electrodeposited Poly(3,4-Ethylenedioxythiophene) Coating", Journal of the Electrochemical Society, 2015, vol. 162 (10), pp. C536-C544.

*Primary Examiner* — C Melissa Koslow
(74) *Attorney, Agent, or Firm* — Birch, Stewart, Kolasch & Birch, LLP

(57) ABSTRACT

A conductive composite is provided, which includes a conductive conjugated polymer and a mixture. The mixture includes (a) boron oxide, and (b) sulfur-containing compound, nitrogen-containing compound, or a combination thereof. A capacitor is also provided, which includes an anode electrode, a dielectric layer on the anode electrode, a cathode electrode, and an electrolyte between the dielectric layer and the cathode electrode, wherein the electrolyte includes the described conductive composite.

14 Claims, 1 Drawing Sheet

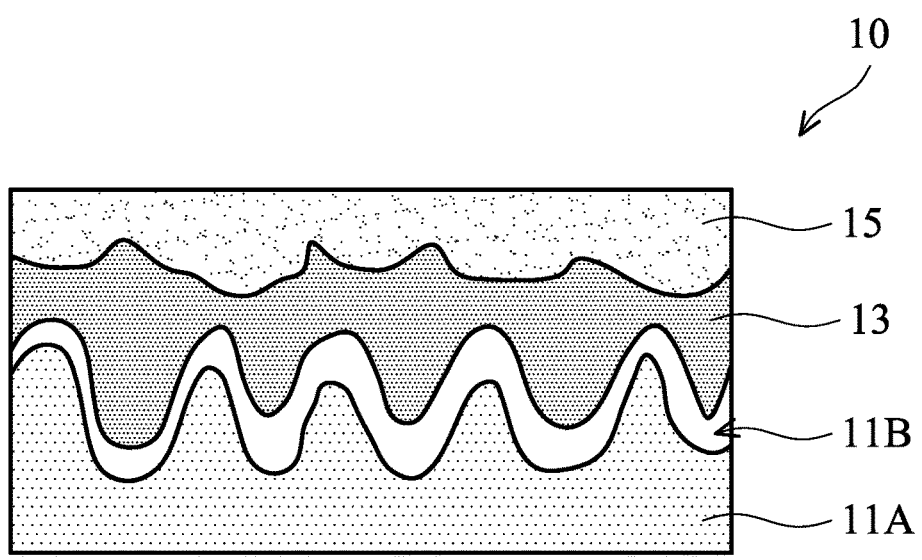

CONDUCTIVE COMPOSITE AND CAPACITOR UTILIZING THE SAME

CROSS REFERENCE TO RELATED APPLICATIONS

The present application is based on, and claims priority from, Taiwan Application Serial Number 104143523, filed on Dec. 24, 2015, the disclosure of which is hereby incorporated by reference herein in its entirety.

TECHNICAL FIELD

The technical field relates to a conductive composite and a capacitor utilizing the same.

BACKGROUND

A major topic of developing a novel electrolytic capacitor is increasing the conductivity and stability of the electrolyte to reduce the equivalent series resistance (ESR) and improve the reliability of a capacitor. A conductive conjugated polymer has higher conductivity and stability than a liquid-state electrolyte or a solid-state organic semiconductor complex salt (e.g. TCNQ composite salt) in a conventional electrolytic capacitor. As a result, the conductive conjugated polymer is one of the best candidates for the electrolyte of the electrolytic capacitors with low ESR and high reliability.

Although a conductive conjugated polymer used as the electrolyte of an electrolytic capacitor has the advantages mentioned above, however, the withstanding voltage of the capacitor with a conductive conjugated polymer is dramatically lower than that of the capacitor with a liquid-state electrolyte. In addition, the permeability of the conductive conjugated polymer in the micro-hole of the dielectric layer is dramatically lower than that of the liquid-state electrolyte. As such, the low working voltage and low capacitance are the major shortcomings for the electrolytic capacitor with a conductive conjugated polymer served as an electrolyte.

Accordingly, a novel conductive composite for electrolyte is called for to overcome the limitations described above to enhance the performance of the electrolytic capacitor.

SUMMARY

One embodiment of the disclosure provides a conductive composite, comprising: a conductive conjugated polymer; and a mixture, wherein the mixture comprises (a) boron oxide and (b) sulfur-containing compound, nitrogen-containing compound, or a combination thereof.

One embodiment of the disclosure provides a capacitor structure, comprising: an anode electrode; a dielectric layer on the anode electrode; a cathode electrode; and an electrolyte disposed between the dielectric layer and the cathode electrode, wherein the electrolyte comprises the described conductive composite.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows schematic diagram of a capacitor in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

As shown in FIG. 1, in one embodiment of the disclosure, a capacitor 10 includes an anode electrode 11A, a dielectric layer 11B on the anode electrode 11A, a cathode electrode 15, and an electrolyte 13 disposed between the dielectric layer 11B and the cathode electrode 15. In one embodiment, the anode electrode 11A can be a metal such as aluminum, tantalum, niobium, titanium, zirconium, or an alloy thereof. The anode electrode 11A can be a sheet or a porous pellet which is made of sintering particles. In one embodiment, an etching treatment can optionally be applied on the anode electrode 11A to increase the surface area.

In one embodiment of the disclosure, the dielectric layer 11B can be an oxide which is obtained by oxidizing the anode electrode 11A. For example, performing electrochemical oxidation on the anode electrode 11A (e.g. aluminum foil), thereby the dielectric layer 11B (e.g. aluminum oxide) on the anode electrode 11A is obtained. In some embodiments, the dielectric layer 11B can be formed by other methods, for example, depositing at least one of the inorganic oxide and organic-inorganic composite by sputtering process to form single layer or multi-layer of the dielectric layer 11B on the anode electrode 11A.

In one embodiment of the disclosure, the cathode electrode 15 can be a metal foil such as aluminum foil. In one embodiment, an etching treatment can optionally be applied on the cathode electrode 15 to increase the surface area. In some embodiments, other materials such as carbon or titanium can be coated on the surface of cathode electrode 15 to enhance chemical stability or capacitance of the capacitor 10. In some embodiments, the cathode electrode 15 can be a silver glue or a carbon glue.

A separator (not shown) can be optionally disposed between the anode electrode 11 and the cathode electrode 15, and then performing a winding process to form an electrolytic capacitor element. In some embodiments, the electrolytic capacitor element can be treated with an organic acid aqueous solution to repair the damaged dielectric layer 11B. In one embodiment, the organic acid can be oxalic acid or acetic acid.

Next, the electrolytic capacitor element is impregnated in a precursor of the conductive conjugated polymer, and then performing a polymerization to form the conductive conjugated polymer between the dielectric layer 11B and the cathode electrode 15.

Next, the electrolytic capacitor element having the conductive conjugated polymer is soaked in the mixture, which includes (a) boron oxide and (b) sulfur-containing compound, nitrogen-containing compound, or a combination thereof, to form the conductive composite. An electrolytic capacitor is obtained in which the conductive composite serves as the electrolyte 13 disposed between the dielectric layer 11B and the cathode electrode 15. The experimental results show that the mixture, which includes (a) boron oxide and (b) sulfur-containing compound, nitrogen-containing compound, or a combination thereof, can enhance the capacitance, withstanding voltage, and thermal stability of the capacitor.

In one embodiment of the disclosure, the electrolyte 13 can be a conductive composite including a conductive conjugated polymer and a mixture which includes (a) boron oxide and (b) sulfur-containing compound, nitrogen-containing compound, or a combination thereof. In one embodiment, the conductive conjugated polymer can be polythiophene, polypyrrole, poly(p-phenylene vinylene), polyphenylene sulfide, polyaniline, a derivative thereof (such as poly(3,4-alkylenedioxythiophene), poly(3,4-ethylenedioxythiophene) (PEDOT), poly(3,4-propylenedioxythiophene) (PProDOT), or poly(Thieno[3,4-b]-1,4-dioxin-2-methanol)), or a copolymer having the above chemical structure (such as PEDOT-co-polyethylene glycol), or a blend including the polymer mentioned-above (such as PEDOT-poly(vinyl pyrrolidone) blend PEDOT-polyethylene glycol blend, or PEDOT-polyvinyl alcohol blend).

A dopant can be used to dope the conductive conjugated polymer for improving the electrical conductivity of the conductive conjugated polymer. In one embodiment, the dopant can be sulfonic acid derivatives, such as methane sulfonic acid, benzene sulfonic acid, or p-toluene sulfonic acid; sulfonic polymer derivatives, such as poly(styrene sulfonic acid) (PSA), polystyrene sulfonate (PSS), sulfonated polyether ether ketone, or a copolymer thereof (e.g. PSA-co-poly(vinyl pyrrolidone) or PSA-co-polyethylene glycol); carboxylic acid derivatives, such as benzoic acid, benzene dicarboxylic acid, or succinic acid; carboxylic polymer derivatives, such as polyacrylic acid or a copolymer thereof; amino acid derivatives, such as glycine; phosphoric acid derivatives, such as phosphoric acid, etidronic acid, or diphenyl phosphate); or a combination thereof.

The method for preparing the doped conductive conjugated polymer can be: for example, polymerizing the monomer of the conjugated polymer and then adding the dopant to perform the doping process; or, adding the dopant during the polymerization of the conjugated polymer. Also, a by-product which is generated during the polymerization, originated from the oxidant, of the conjugated polymer can be used as a dopant to perform the doping process. For example, p-toluene sulfonic acid which is generated during the polymerization, originated from the iron(III) p-toluene-sulfonate, of the conjugated polymer can serve as a dopant.

The method for preparing the conductive conjugated polymer can be: for example, polymerizing the precursor of the conductive conjugated polymer on the surface of the dielectric layer to obtain the conductive conjugated polymer; polymerizing the monomer of the conductive conjugated polymer with electrochemical polymerization on the surface of the dielectric layer to obtain the conductive conjugated polymer; or, coating or impregnating an aqueous solution of a water-soluble conductive polymer (e.g. poly(3,4-ethylenedioxythiophene)-poly(styrenesulfonate), PEDOT:PSS) on the surface of the dielectric layer to form the conductive conjugated polymer. An oxidant used in the chemical polymerization can be an iron ion-containing salt, a copper ion-containing salt, or a persulfate salt. The iron-containing salt can be iron (III) benzene sulfonic acid, iron (III) p-toluene sulfonic acid, iron chloride, iron nitrate, iron sulfate, or a combination thereof.

The mixing procedures of the aforementioned components for forming the conductive composite can be changed optionally. For example, the nitrogen-containing compound or the sulfur-containing compound may be mixed with the monomer or the oxidant at first, and then boron oxide added.

The aforementioned boron oxide can be particle-type, wherein the size of the particles is not limited. In one embodiment, the particle size of the boron oxide is smaller than 1000 μm. In one embodiment, the average particle size of the boron oxide is about 4.3 μm. The content of boron oxide in the mixture is not limited. In one embodiment, the mixture may have boron oxide content less than 60 wt %, such as between 5 wt % and 20 wt %.

The aforementioned sulfur-containing compound can be sulfone, such as sulfolane, dimethyl sulfoxide, or a combination thereof thiophene, such as 3,4-dimethoxy-thiophene; thiol, such as 1-ethyl-1H-imidazole-2-thiol; or a combination thereof. The amount of the sulfur-containing compound is not limited. The sulfur-containing compound and the boron oxide may have a molar ratio between 1:100 and 100:1. In one embodiment, the sulfur-containing compound and the boron oxide have a molar ratio between 11:1 and 2:1. The sulfur-containing compound and the boron oxide may have a weight ratio between 1:100 and 100:1. In one embodiment, the sulfur-containing compound and the boron oxide have a weight ratio between 20:1 and 4:1.

The aforementioned nitrogen-containing compound can be amide, such as formamide, acetamide, caprolactam, or a combination thereof; imide, such as succinimide; urethane, such as ethyl urethane, N,N'-dimethyl urethane, tetramethylurea or a combination thereof; imidazole compound, such as imidazole, 1-methylimidazole, 2-methylimidazole, or a combination thereof; triazole; pyridine compound, such as pyridine; pyrrolidone, such as N-methylpyrrolidone; urea; or a combination thereof. The amount of nitrogen-containing compound is not limited. The nitrogen-containing compound and the boron oxide may have a molar ratio between 1:100 and 100:1. In one embodiment, the nitrogen-containing compound and the boron oxide have a molar ratio of about 7:1. In one embodiment, the nitrogen-containing compound and the boron oxide have a molar ratio of about 1:1. The nitrogen-containing compound and the boron oxide may have a weight ratio between 1:100 and 100:1. In one embodiment, the nitrogen-containing compound and the boron oxide have a weight ratio between 10:1 and 1:1.

The mixture can further include some of (c) solvent. The solvent may be helpful for reducing the viscosity of the mixture or enhancing the dispersion (or dissolution) of the mixture. The amount of the solvent is not limited. When the nitrogen-containing compound and the sulfur-containing compound which is liquid-state at room temperature (about 25° C.) or has a melting point lower than 105° C. at atmospheric pressure (about 1 atm), the nitrogen-containing compound and the sulfur-containing compound can also serve as the solvent. After boron oxide and the nitrogen-containing or the sulfur-containing compound impregnates into the capacitor, the solvent can be removed or exist in the capacitor.

The solvent can be ester (e.g. γ-butyrolactone), carbonate (e.g. ethylene carobonate, propylene carbonate, or a combination thereof), ether (e.g. diethylene glycol dibutyl ether or polyethylene glycol), ketone (e.g. methyl isobutyl ketone), alcohol (e.g. ethylene glycol or glycerol), or a combination thereof. In one embodiment, the solvent is propylene carbonate. In one embodiment, the solvent content is between 40 wt % and 60 wt %, based on the total weight of the mixture.

The mixture, which is composed of the boron oxide, the nitrogen-containing or the sulfur-containing compound, and the solvent, may be in solution-state or suspension-state.

Other compounds can be added into the conductive composite to adjust the properties if needed. For example, polyethylene glycol can be added for improving the impedance of the capacitor, or a crosslinking resin (e.g. epoxy) can be added for enhancing the structural stability of the electrolyte.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

vacuumed at 50° C. for 1 hour. During the first 30 minutes of the vacuuming period, the mixture was added every 10 minutes (3 times) to ensure that the amount of the mixture was enough to fully impregnate into the capacitor element. The capacitor element was then sealed in an aluminum case with a rubber cap, and charged at 18.4V, 125° C. for 2 hours for the overload test. The properties of the capacitors were then measured at room temperature, as tabulated in Table 1.

TABLE 1

| | Mixture composition* (sulfolane, containing 10 wt % of X) | | | Properties of the capacitor after heat treatment | | Properties of the capacitor after 18.4 V overload test** | | 18.4 V leakage current | Short circuit ratio |
|---|---|---|---|---|---|---|---|---|---|
| Number | X | Sulfolane | | Cap ($\mu F$) | 100 kHz ESR ($m\Omega$) | Cap ($\mu F$) | 100 kHz ESR ($m\Omega$) | ($\mu A$) | (%) |
| Example 1-1 | 0 | 0 | Average Standard Deviation | 239.86 3.39 | 13.91 0.30 | 229.57 3.35 | 14.52 0.32 | 16.62 2.51 | 0 |
| Example 1-2 | 0 | 100 | Average Standard Deviation | 446.16 2.75 | 13.08 0.38 | 396.62 8.14 | 20.11 1.28 | 4.44 0.84 | 0 |
| Example 1-3 | Boron acid | 90 | Average Standard Deviation | 458.66 1.04 | 11.91 0.26 | 286.53 35.74 | 23.63 4.01 | 56.65 49.57 | 20 |
| Example 1-4 | Boron oxide | 90 | Average Standard Deviation | 427.90 6.86 | 13.09 0.41 | 422.23 2.66 | 14.08 0.61 | 7.40 6.68 | 0 |
| Example 1-5 | 4 Å Molecular sieve | 90 | Average Standard Deviation | 441.90 5.73 | 13.39 0.46 | 410.00 6.53 | 21.04 0.61 | 5.30 2.38 | 20 |
| Example 1-6 | Zinc oxide | 90 | Average Standard Deviation | 449.30 1.99 | 13.22 0.24 | 402.80 5.03 | 24.24 2.22 | 6.68 4.74 | 0 |

*Average particle size of molecular sieve: 2.5 μm; average particle size of boron acid: 3.7 μm; average particle size of boron oxide: 4.3 μm; average particle size of zinc oxide: 20 nm. The molecular sieves was pretreated with drying at 200° C. for more than 8 hours to remove the adsorbed water.
**The short-circuited capacitors were not counted into a determination of the properties after the overload test.

EXAMPLES

Example 1

An aluminum foil was anodized at 33V to form an aluminum oxide dielectric layer on the aluminum foil and then served as an anode electrode of a capacitor. An aluminum foil coated with a carbon layer served as the cathode electrode. The said anode electrode, cathode electrode, and a separator inserted between the anode and cathode were then wound together to form an electrolytic capacitor element. Furthermore, the electrolytic capacitor element was electrochemically treated with an organic acid aqueous solution to repair the damaged aluminum oxide dielectric layer.

Next, the electrolytic capacitor element was impregnated in a precursor composed of 3,4-ethylenedioxythiophene (EDOT) monomer and a solution of 50 wt % iron(III) toluene sulfonic acid in ethanol, and then heated up to 170° C. to speed up the polymerization of the EDOT. Then, a doped conductive poly(3,4-ethylenedioxythiophene) (PEDOT) was formed between the aluminum oxide dielectric layer and the cathode electrode.

Next, the electrolytic capacitor element having PEDOT was soaked into the mixtures as shown in Table 1, and Example 1-1 shows the properties of the electrolytic capacitor having PEDOT without any mixtures or solvent. Example 1-2 shows the properties of the electrolytic capacitor having PEDOT with pure sulfolane. Examples 1-3 to 1-6 show the properties of the electrolytic capacitors having PEDOT with the mixtures composed of 10 wt % substances (i.e. "X") such as boron acid, boron oxide, molecular sieve, and zinc oxide in sulfolane.

In Table 1, after the heat treatment, the capacitances of the capacitors in Example 1-2 to 1-6 are significantly higher than that in Example 1-1. The 100 kHz ESRs of the capacitors in Examples 1-2 to 1-6 are close to that in Example 1-1.

The suitably maximum working-voltage for the dielectric layer of the capacitors in Example 1 was 16V. After the overload test at 18.4V, 125° C. for 2 hours, the properties of the capacitors in Examples 1-1 to 1-6 exhibited obvious differences. Except for Example 1-4, the capacitances of the capacitors in Examples 1-1 to 1-6 were dramatically decreased after the overload test. But the capacitance in Example 1-4 (PEDOT combined with the mixture of 10 wt % of boron oxide in sulfolane) was almost unchanged. With regards to the 100 kHz ESRs, except that the capacitors in Example 1-4 increased slightly, the other capacitors in Examples 1-1 to 1-6 were increased dramatically after the 18.4V overload test. Furthermore, part of the capacitors in Example 1-3 and Example 1-5 even short-circuited during the overload test, which means that the dielectric layer in the capacitor was seriously damaged.

To sum up, although the properties of the capacitors in Example 1-1 to 1-6 were similar after the heat treatment, only the capacitors in Example 1-4 maintained high capacitance, low impedance after the overload test, which means that the mixture of boron oxide and sulfolane can improve the voltage-withstanding properties of the capacitor with PEDOT at high temperature.

Example 2

Example 2 was similar to Example 1, except for the compositions of the mixtures were replaced and shown in Table 2. The other conditions were the same as those in Example 1.

other hand, the 100 kHz ESRs of the capacitors in Examples 2-1 to 2-4 exhibit no significant differences.

Reversely, the capacitances and the 100 kHz ESRs of the capacitors exhibited obvious differences after the 18.4V overload test. With regards to the capacitances, the capacitance of the capacitor in Example 2-1 showed the largest decay, and the second is the capacitor with the mixture containing 5 wt % of boron oxide (Example 2-2). The capacitance of the capacitor with the mixture containing 10 wt % of boron oxide (Example 2-3) and 15 wt % of boron oxide (Example 2-4) exhibited almost no changes. With regards to the 100 kHz ESR characteristics, the decay of the 100 kHz ESR shrank with the increase of the boron oxide content in the sulfolane mixture. In summary, the overvolt-

TABLE 2

| Number | Mixture composition (wt %) | | | Properties of the capacitor after heat treatment | | Properties of the capacitor after 18.4 V overload test* | | | Short circuit ratio |
|---|---|---|---|---|---|---|---|---|---|
| | Boron oxide | Sulfolane | | Cap (µF) | 100 kHz ESR (mΩ) | Cap (µF) | 100 kHz ESR (mΩ) | 18.4 V leakage current (µA) | (%) |
| Example 2-1 | — | 100 | Average | 446.16 | 13.08 | 396.62 | 20.11 | 4.44 | 0 |
| | | | Standard Deviation | 2.75 | 0.38 | 8.14 | 1.28 | 0.84 | |
| Example 2-2 | 5 | 95 | Average | 428.46 | 13.70 | 402.09 | 15.71 | 5.06 | 0 |
| | | | Standard Deviation | 3.05 | 0.25 | 7.73 | 1.50 | 0.62 | |
| Example 2-3 | 10 | 90 | Average | 427.90 | 13.09 | 422.23 | 14.08 | 7.40 | 0 |
| | | | Standard Deviation | 6.86 | 0.41 | 2.66 | 0.61 | 6.68 | |
| Example 2-4 | 20 | 80 | Average | 425.12 | 13.20 | 422.70 | 13.98 | 5.68 | 0 |
| | | | Standard Deviation | 2.27 | 0.54 | 2.08 | 0.60 | 2.45 | |

*The short-circuited capacitors were not counted into a determination of the properties after the over load test.

Example 2 was for the comparison of the effect of boron oxide content in the mixture to the properties of the capacitor. Example 2-1 shows the properties of the electrolytic capacitor having PEDOT with pure sulfolane. Examples 2-2 to 2-4 show the properties of the electrolytic capacitor having PEDOT with the sulfolane mixture containing 5 wt %, 10 wt %, and 20 wt % of boron oxide, respectively.

As shown in Table 2, after the heat treatment, the capacitances of the capacitors in Examples 2-2 to 2-4 (the sulfolane mixture containing 5 wt %, 10 wt %, and 20 wt % of boron oxide, respectively) are slightly lower than Example 2-1 (the capacitors contained PEDOT with pure sulfolane). On the age withstanding ability of the capacitor improved with the increase of the boron oxide content in the mixture.

Example 3

Example 3 was similar to Example 1, except that the composition of the mixtures was replaced and shown in Table 3. The other conditions were the same as those in Example 1.

TABLE 3

| Number | Mixture composition (wt %) | | | Properties of the capacitor after heat treatment | | Properties of the capacitor after 18.4 V overload test* | | | Short circuit ratio |
|---|---|---|---|---|---|---|---|---|---|
| | Boron oxide | NMP | | Cap (µF) | 100 kHz ESR (mΩ) | Cap (µF) | 100 kHz ESR (mΩ) | 18.4 V leakage current (µA) | (%) |
| Example 3-1 | — | 100 | Average | 416.44 | 17.38 | 283.70 | 219.40 | 181.00 | 80 |
| | | | Standard Deviation | 2.61 | 0.79 | — | — | — | |
| Example 3-2 | 10 | 90 | Average | 409.12 | 18.12 | 416.50 | 21.30 | 4.60 | 0 |
| | | | Standard Deviation | 1.91 | 0.91 | 2.86 | 1.55 | 2.30 | |

*The short-circuited capacitors were not counted into a determination of the properties after the overload test.

In Example 3, N-methylpyrrolidone (NMP) was used as the solvent of the mixtures. Example 3-1 shows the properties of the electrolytic capacitor having PEDOT with pure NMP. Example 3-2 shows the properties of the electrolytic capacitor having PEDOT combined with NMP mixture containing 10 wt % of boron oxide.

As shown in Table 3, the properties of the capacitors in Examples 3-1 and 3-2 are close after the heat treatment. However, the capacitance of the capacitor in Example 3-1 was dramatically decreased after the 18.4V overload test. Furthermore, 80% of the capacitors in Example 3-1 (pure NMP) was short during the overvoltage loading at high temperatures. Reversely, the capacitance in Example 3-2 exhibited no significant changes, and the 100 kHz ESR just increased slightly and no capacitor was short after the 18.4V overload test. In summary, the mixture of boron oxide and NMP could effectively enhance the withstanding overvoltage ability of the capacitor.

Example 4

Example 4 was similar to Example 1, except that the composition of the mixtures was replaced and shown in Table 4. The other conditions were the same as those in Example 1.

tor having PEDOT combined with DMSO mixture containing 10 wt % of boron oxide.

As shown in Table 4, the capacitance and the 100 kHz ESR of the capacitor in Example 4-1 (pure DMSO) are slightly higher than in Example 4-2 (DMSO mixture containing boron oxide) after the heat treatment. However, after the 18.4V overload test (at 125° C. for 2 hours), the 100 kHz ESR of the capacitor in Example 4-1 (pure DMSO) was dramatically increased. On the other hand, the 100 kHz ESR of the capacitor in Example 4-2, exhibited no significant changes. In addition, 20% of the capacitors in example 4-1 were short during the process of the overload test at a high temperature. Reversely, in Example 4-2, no capacitor was short. In summary, the mixture of boron oxide and DMSO could effectively enhance the withstanding overvoltage ability of the capacitor.

Example 5

Example 5 was similar to Example 1, except that the composition of the mixtures was replaced and shown in Table 5. The other conditions were the same as those in Example 1.

TABLE 4

| Number | Mixture composition (wt %) | | | Properties of the capacitor after heat treatment | | Properties of the capacitor after 18.4 V overload test* | | 18.4 V leakage current | Short circuit ratio |
|---|---|---|---|---|---|---|---|---|---|
| | Boron oxide | DMSO | | Cap (µF) | 100 kHz ESR (mΩ) | Cap (µF) | 100 kHz ESR (mΩ) | (µA) | (%) |
| Example 4-1 | — | 100 | Average | 471.24 | 15.24 | 466.49 | 21.70 | 11.23 | 20 |
| | | | Standard Deviation | 3.19 | 0.53 | 4.47 | 7.73 | 10.06 | |
| Example 4-2 | 10 | 90 | Average | 453.40 | 16.75 | 463.44 | 16.22 | 7.10 | 0 |
| | | | Standard Deviation | 12.00 | 1.75 | 3.02 | 0.48 | 5.41 | |

*The short-circuited capacitors were not counted into a determination of the properties after the overload test.

In Example 4, dimethyl sulfoxide (DMSO) was used as a mixing medium. Example 4-1 shows the properties of electrolytic capacitor having PEDOT with pure DMSO. Example 4-2 shows the properties of the electrolytic capaci-

TABLE 5

| Number | Mixture composition (wt %) | | | | Properties of the capacitor after heat treatment | | Properties of the capacitor after 18.4 V overload test* | | 18.4 V leakage current | Short circuit ratio |
|---|---|---|---|---|---|---|---|---|---|---|
| | Boron oxide | Y (wt %) | PC | | Cap (µF) | 100 kHz ESR (mΩ) | Cap (µF) | 100 kHz ESR (mΩ) | (µA) | (%) |
| Example 5-1 | — | — | 100 | Average | 460.73 | 13.75 | — | — | — | 100 |
| | | | | Standard Deviation | 3.00 | 1.40 | — | — | — | |
| Example 5-2 | 20 | — | 80 | Average | 456.67 | 13.49 | — | — | — | 100 |
| | | | | Standard Deviation | 3.86 | 1.14 | — | — | — | |
| Example 5-3 | 20 | 1-methyl-imidazole (23.6) | 56.4 | Average | 456.88 | 17.87 | 454.03 | 19.44 | 3.60 | 0 |
| | | | | Standard Deviation | 4.20 | 0.73 | 1.63 | 1.70 | 0.43 | |

TABLE 5-continued

| | Mixture composition (wt %) | | | | Properties of the capacitor after heat treatment | | Properties of the capacitor after 18.4 V overload test* | | | |
|---|---|---|---|---|---|---|---|---|---|---|
| | | | | | Cap | 100 kHz ESR | Cap | 100 kHz ESR | 18.4 V leakage current | Short circuit ratio |
| Number | Boron oxide | Y (wt %) | PC | | (μF) | (mΩ) | (μF) | (mΩ) | (μA) | (%) |
| Example 5-4 | 20 | capro-lactam (33) | 47 | Average Standard Deviation | 457.24 3.78 | 12.06 0.76 | 455.78 3.90 | 12.20 0.45 | 7.30 3.62 | 0 |

*The short-circuited capacitors were not counted into a determination of the properties after the overload test.

Example 5-1 shows the properties of electrolytic capacitor having PEDOT with pure propylene carbonate (PC). Example 5-2 shows the properties of electrolytic capacitor having PEDOT with PC mixture containing 20 wt % of boron oxide. Example 5-3 shows the properties of electrolytic capacitor having PEDOT with the mixture of 1-methylimidazole, boron oxide, and PC, wherein boron oxide and 1-methylimidazole had a molar ratio of 1:1. Example 5-4 shows the properties of electrolytic capacitor having PEDOT with the mixture of boron oxide, caprolactam, and PC, wherein boron oxide and caprolactam had a molar ratio of 1:1.

As shown in Table 5, the capacitances of the capacitors in Examples 5-1 to 5-4 are close after the heat treatment. The 100 kHz ESRs of the capacitors in Example 5-1 and 5-2 are close, whereas in Example 5-3 it is slightly higher, and in Example 5-4 it is the lowest. However, after the overload test at a high temperature, all the capacitors in Examples 5-1 and 5-2 short-circuited, but all the capacitors in Example 5-3 and 5-4 did not short-circuit. Moreover, the capacitance and the 100 kHz ESR of the capacitor in Example 5-3 slightly increased, and in Example 5-4 they exhibited almost no change.

In summary, the capacitor is not affordable to withstand high voltage, as the electrolyte is merely composed of a conjugated conductive polymer and pure PC or even a conductive conjugated polymer, PC and boron oxide. But, when the nitrogen-containing compound is added into the composite which includes a conductive conjugated polymer, PC, and boron oxide, the withstanding voltage ability of the capacitor can be significantly enhanced.

Example 6

An aluminum foil was anodized at 41V to form an aluminum oxide dielectric layer on the aluminum foil and then served as an anode electrode of an electrolytic capacitor. A surface-etched aluminum foil served as the cathode electrode. A separator was disposed between the said anode electrode and the said cathode electrode, which were then wound together to form an electrolytic capacitor element. The electrolytic capacitor element was treated with an organic acid aqueous solution to repair the damaged aluminum oxide dielectric layer.

Next, the electrolytic capacitor element was impregnated in a precursor composed of 3,4-ethylenedioxythiophene (EDOT) monomer and an ethanol solution of iron(III) toluene sulfonic acid (concentration of 50 wt %), and then heated up to 170° C. to proceed the polymerization of the EDOT. Then, a doped PEDOT was formed between the aluminum oxide dielectric layer and the cathode electrode of a capacitor element.

Next, the other steps were the same as those in Example 1, and the properties of the capacitor are shown in Table 6.

TABLE 6

| | Mixture composition (wt %) | | | Properties of the capacitor after heat treatment | | Properties of the capacitor after 23 V overload test | | | |
|---|---|---|---|---|---|---|---|---|---|
| | | | | Cap | 100 kHz ESR | Cap | 100 kHz ESR | 23 V leakage current | Short circuit ratio |
| Number | Boron oxide | Sulfolane | | (μF) | (mΩ) | (μF) | (mΩ) | (μA) | (%) |
| Example 6-1 | — | 100 | Average Standard Deviation | 201.40 1.33 | 31.84 1.25 | 186.38 3.23 | 41.16 1.70 | 4.20 2.29 | 0 |
| Example 6-2 | 10 | 90 | Average Standard Deviation | 198.48 3.09 | 29.62 2.76 | 191.28 2.93 | 30.86 3.31 | 3.28 0.81 | 0 |

Example 6-1 shows the properties of electrolytic capacitor having PEDOT with pure sulfolane. Example 6-2 shows the properties of electrolytic capacitor having PEDOT with sulfolane mixture containing 10 wt % of boron oxide.

The suitable working voltage of the capacitor was 20V. After the high temperature (125° C.) overvoltage (23V) load test, the results were similar to Example 1. That is, the changes in the capacitance and the 100 kHz ESR of the capacitor in Example 6-2 (sulfolane mixture containing 10 wt % of boron oxide) were less than in Example 6-1 (pure sulfolane). This means that the materials of the cathode electrode would not affect the effect of the sulfolane mixture to the withstanding voltage of the capacitor at high temperature.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A conductive composite, comprising:
   a conductive conjugated polymer; and
   a mixture, wherein the mixture comprises (a) boron oxide and (b) sulfur-containing compound, nitrogen-containing compound, or a combination thereof.

2. The conductive composite as claimed in claim 1, wherein the conductive conjugated polymer comprises polythiophene, polypyrrole, poly(p-phenylene vinylene), polyphenylene sulfide, polyaniline, a copolymer thereof, or a blend thereof.

3. The conductive composite as claimed in claim 1, wherein the sulfur-containing compound comprises sulfone, thiophene, thiol, or a combination thereof.

4. The conductive composite as claimed in claim 3, wherein the sulfone comprises sulfolane, dimethyl sulfoxide, or a combination thereof.

5. The conductive composite as claimed in claim 3, wherein the thiophene comprises 3,4-dimethoxy-thiophene.

6. The conductive composite as claimed in claim 1, wherein the nitrogen-containing compound comprises amide, imide, urethane, imidazole compound, triazole, pyridine compound, pyrrolidone, urea, or a combination thereof.

7. The conductive composite as claimed in claim 6, wherein the amide comprises formamide, acetamide, caprolactam, or a combination thereof.

8. The conductive composite as claimed in claim 6, wherein the imide comprises succinimide.

9. The conductive composite as claimed in claim 6, wherein the urethane comprises ethyl urethane, N,N'-dimethyl urethane, tetramethylurea, or a combination thereof.

10. The conductive composite as claimed in claim 6, wherein the imidazole compound comprises imidazole, 1-methylimidazole, 2-methylimidazole, or a combination thereof.

11. The conductive composite as claimed in claim 1, wherein the mixture further comprises (c) solvent, wherein the solvent comprises ester, carbonate, ether, ketone, alcohol, or a combination thereof.

12. A capacitor, comprising:
    an anode electrode;
    a dielectric layer on the anode electrode;
    a cathode electrode; and
    an electrolyte disposed between the dielectric layer and the cathode electrode,
    wherein the electrolyte comprises the conductive composite as claimed in claim 1.

13. The capacitor as claimed in claim 12, wherein the anode electrode comprises aluminum, tantalum, niobium, titanium, zirconium, or an alloy thereof.

14. The capacitor as claimed in claim 12, wherein the dielectric layer comprises an oxide of the anode electrode.

* * * * *